United States Patent [19]
Takano et al.

[11] Patent Number: 6,091,836
[45] Date of Patent: *Jul. 18, 2000

[54] METHOD FOR CLASSIFYING FEATURES AND A MAP REPRESENTING THE FEATURES

[75] Inventors: Ruriko Takano; Tsuneyuki Abe; Namiko Kobayashi; Etsu Nishijima; Yukie Shigemi; Setsuko Suzuki, all of Tokyo, Japan

[73] Assignee: Shiseido Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,336

[22] Filed: Sep. 4, 1997

[30] Foreign Application Priority Data

Sep. 5, 1996 [JP] Japan .................................. 8-235528

[51] Int. Cl.[7] ...................................................... G06K 9/00
[52] U.S. Cl. ............................................ 382/118; 382/100
[58] Field of Search ...................................... 382/100, 111, 382/115, 117, 118, 199; 364/512; 235/380; 283/70, 77; 340/825.34; 902/3; 434/100

[56] References Cited

U.S. PATENT DOCUMENTS

| | | | |
|---|---|---|---|
| 5,450,504 | 9/1995 | Calia ........................................ | 382/118 |
| 5,495,338 | 2/1996 | Gouriou et al. ......................... | 356/402 |
| 5,500,673 | 3/1996 | Zhon ....................................... | 382/118 |

(List continued on next page.)

FOREIGN PATENT DOCUMENTS

| | | | |
|---|---|---|---|
| 0552770 | 7/1993 | European Pat. Off. ......... | G06K 9/46 |
| 2-68666 | 3/1990 | Japan ............................... | G06F 15/62 |
| 3-74777 | 3/1991 | Japan ............................... | G06F 15/62 |

(List continued on next page.)

OTHER PUBLICATIONS

Yamaguchi, et al., "Relationships Between Physical Traits and Subjective Impressions of the Face—Age and Gender Information—", Electronics and Communications in Japan, Part 3, Vol. 79–A, No. 2, Feb. 1996, pp. 279–287**.

Morisaki Reiko and Inui Toshiro, "Study of Intracerebral Expressions Upon Discrimination of Similarities in Human Faces", The 59th Japan Psychology Convention at the Ryukyu University**.

Susumu Ikeda, "Discrimination of Human Faces or Expression, Vol. 1", Kansai Daigaku, Mar. 31, 1987**.

A. Samal, et al, "Automatic Recognition and Analysis of Human Faces and Facial Expressions: A Survey", Pattern Recognition, vol. 25, No. 1, Jan. 1992, pp. 65–77, XP000248492, paragraph 4.1; table 3.

(List continued on next page.)

Primary Examiner—Matthew Bella
Attorney, Agent, or Firm—Kenyon & Kenyon

[57] ABSTRACT

A method for classifying a face in which facial features are analyzed so that the face is appropriately classified or recognized in order to facilitate an exact and easy creation of an image produced by applying makeup. A first index represents one of a length of the face and a configuration of formational elements of the face, the formational elements including an eye, an eyebrow, a mouth and a nose. A second index represents one of a contour of the face and a contour of each of the formational elements of the face. A face is classified into one of groups of features each of which provides similar impressions by using the first index and the second index.

8 Claims, 14 Drawing Sheets

U.S. PATENT DOCUMENTS

| | | | |
|---|---|---|---|
| 5,576,778 | 11/1996 | Fujie et al. | 351/177 |
| 5,617,483 | 4/1997 | Osara | 382/159 |
| 5,617,486 | 4/1997 | Chow et al. | 382/159 |
| 5,719,951 | 2/1998 | Shackleton et al. | 382/118 |
| 5,724,484 | 3/1998 | Kagami et al. | 395/10 |
| 5,761,325 | 6/1998 | Batam | 382/100 |
| 5,787,186 | 7/1998 | Schroeder | 382/115 |

FOREIGN PATENT DOCUMENTS

| | | | | |
|---|---|---|---|---|
| 4-1153724 | 4/1992 | Japan | G06F | 15/62 |
| 6-203121 | 7/1994 | Japan | G06F | 15/62 |
| 7-302271 | 11/1995 | Japan | G06F | 17/30 |
| 8-206099 | 8/1996 | Japan | A61B | 5/107 |
| 8-208437 | 8/1996 | Japan | A61K | 7/025 |
| 10-289303 | 10/1998 | Japan | G06F | 15/62 |

OTHER PUBLICATIONS

Li Yuanzhong, et al., "Extraction of Facial Sketch Images and Expression Transformation Based on Facs", Proc. of the International Conference on Image Proc. (ICIP), Washington, Oct. 23–26, 1995, vol. 3, Oct. 23, 1995, pp.520–523, XP000623198, paragraph 4, figure 6.

I.J. Cox, et al., "Feature–Based Face Recognition Using Mixture–Distance", Proc. of the 1996 IEEE Computer Soc., Conference on Computer Vision and Pattern Recognition, San Francisco, Jun. 18–20, 1996, Jun. 18, 1996, pp. 209–216, XP000640243, IEEE, paragraph 3, figure 1, table 1.

Muffin, Apr. 1996, pp. 111–118.

Clique, Mar. 30, 1996, pp. 94–95.

More, No. 174, Dec. 12, 1991, pp. 238–253.

Frau, Mar. 12, 1996, pp. 132–139.

The Psychology of Cosmetlo Behavior, Published by Fragrance Journal Ltd. on Jun. 20, 1993, pp. 85–135.

| | |
|---|---|
| 35 ANGLE: CHIN - OUTER CORNERS OF EYE | 05 |
| 36 ANGLE: CHIN - OUTER ENDS OF EYEBROW | 06 |
| 37 TRAPEZOID AREA: OUTER ENDS OF EYEBROW - OUTER EDGES OF NOSTRILS AT WIDEST POINT | S1 |
| 38 TRAPEZOID AREA: OUTER ENDS OF EYEBROW - OUTER CORNERS OF MOUTH | S2 |

FIG.5A

| | |
|---|---|
| 1 HEIGHT OF EYE<br>2 WIDTH OF EYE<br>3 EXPOSED AREA OF IRIS    E1<br>4 INNER HEIGHT OF IRIS    E3<br>5 OUTER HEIGHT OF IRIS    E4<br>6 HEIGHT OF IRIS    E5<br>7 WIDTH OF IRIS    E6<br>8 DEGREE OF UPWARD SLANT    E7<br>9 AREA INCLUDING EYELASHES    E<br>10 AREA OF EYE    ES | 39 DISTANCE 1: EYE - EYEBROW<br>40 DISTANCE 2: EYE - EYEBROW<br>41 DISTANCE 3: EYE - EYEBROW<br>42 DISTANCE 4: EYE - EYEBROW |

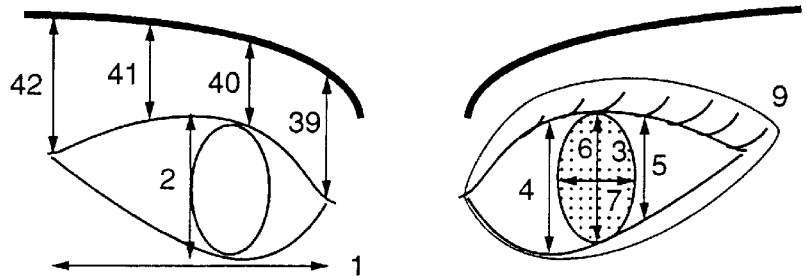

FIG.5B

| | |
|---|---|
| 11 DISTANCE BETWEEN EYEBROW ENDS CONNECTING LINE AND TOP OF EYEBROW SLOPE    B1 | |
| 12 ANGLE OF EYEBROW SLOPE    B2 | |
| 13 DEGREE OF UPWARD SLANT OF EYEBROW    B3 | |
| 14 LENGTH OF EYEBROW    B4 | |
| 15 THICKNESS OF EYEBROW | |
| 16 DEGREE OF UPWARD SLANT OF EYEBROW    B5 | |
| 17 AREA OF EYEBROW    B | |

FIG.5C

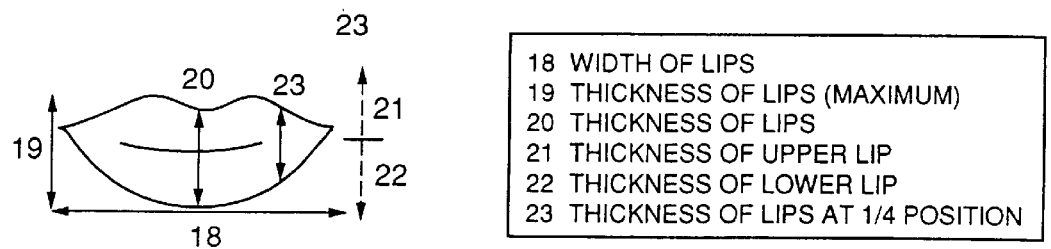

18 WIDTH OF LIPS
19 THICKNESS OF LIPS (MAXIMUM)
20 THICKNESS OF LIPS
21 THICKNESS OF UPPER LIP
22 THICKNESS OF LOWER LIP
23 THICKNESS OF LIPS AT 1/4 POSITION

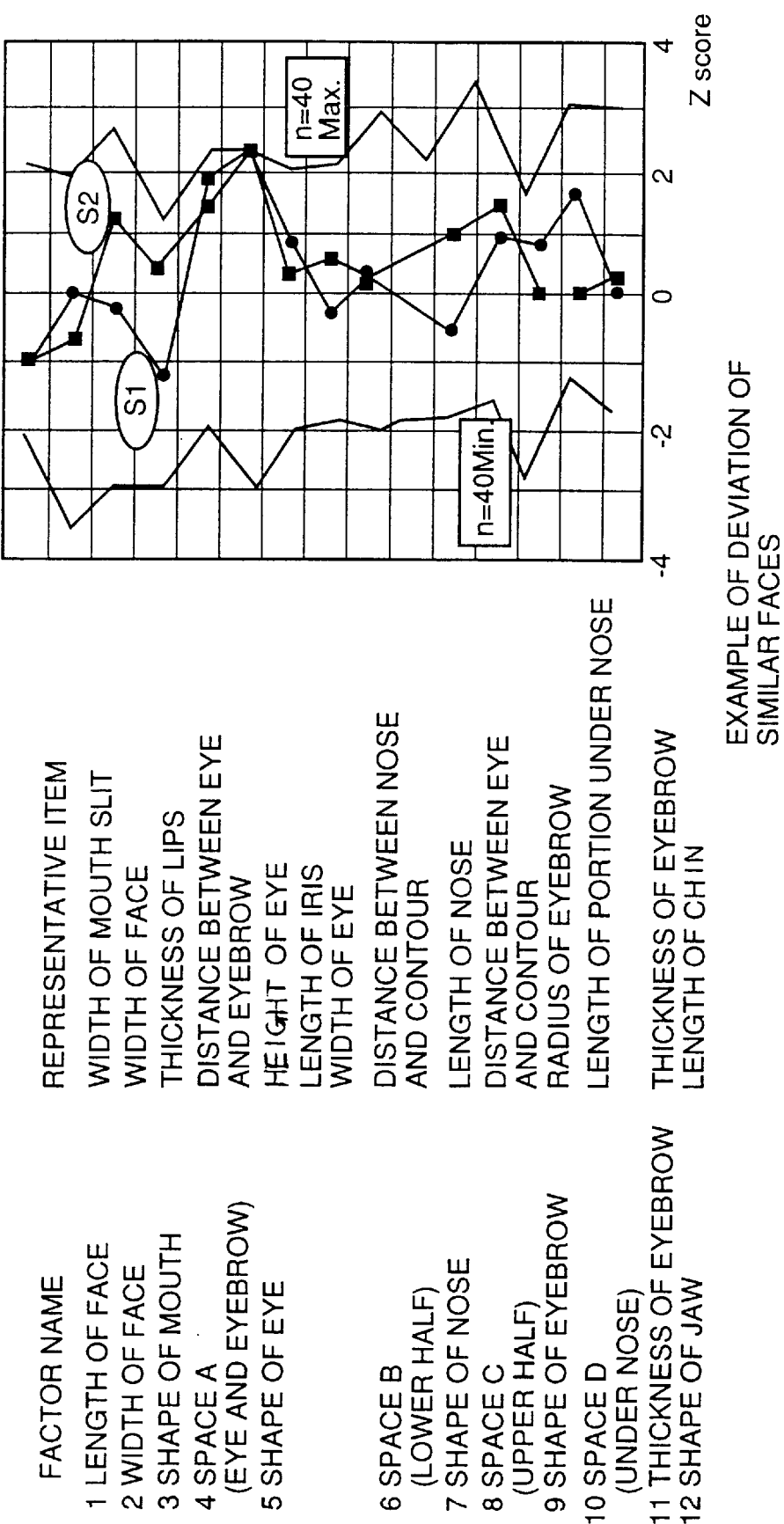

FIG.6

| FACTOR NAME | REPRESENTATIVE ITEM |
|---|---|
| 1 LENGTH OF FACE | WIDTH OF MOUTH SLIT |
| 2 WIDTH OF FACE | WIDTH OF FACE |
| 3 SHAPE OF MOUTH | THICKNESS OF LIPS |
| 4 SPACE A (EYE AND EYEBROW) | DISTANCE BETWEEN EYE AND EYEBROW |
| 5 SHAPE OF EYE | HEIGHT OF EYE |
|  | LENGTH OF IRIS |
|  | WIDTH OF EYE |
| 6 SPACE B (LOWER HALF) | DISTANCE BETWEEN NOSE AND CONTOUR |
| 7 SHAPE OF NOSE | LENGTH OF NOSE |
| 8 SPACE C (UPPER HALF) | DISTANCE BETWEEN EYE AND CONTOUR |
| 9 SHAPE OF EYEBROW | RADIUS OF EYEBROW |
| 10 SPACE D (UNDER NOSE) | LENGTH OF PORTION UNDER NOSE |
| 11 THICKNESS OF EYEBROW | THICKNESS OF EYEBROW |
| 12 SHAPE OF JAW | LENGTH OF CHIN |

EXAMPLE OF DEVIATION OF SIMILAR FACES

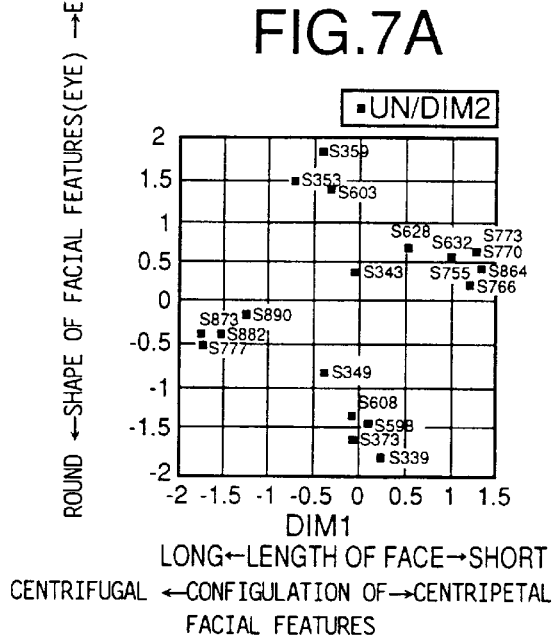
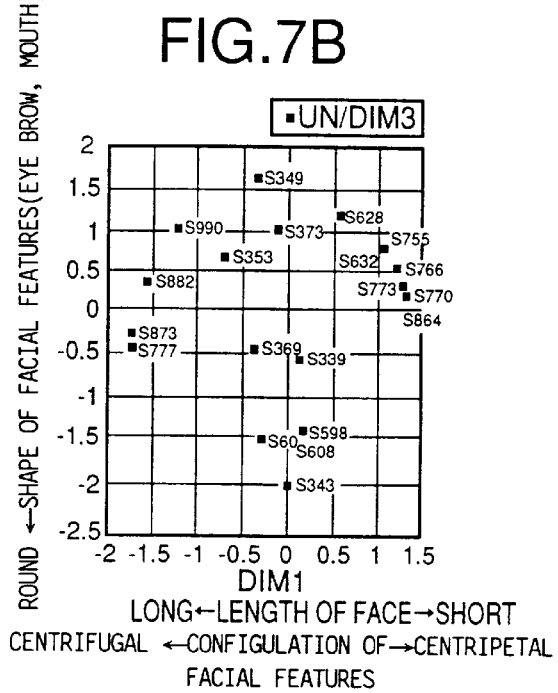
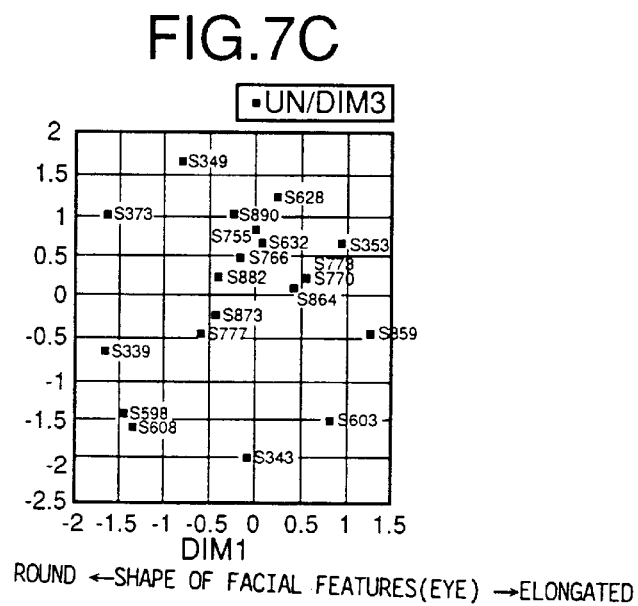

COORDINATES FOR CLASSIFYING FEATURE

IMPRESSION FOR EACH QUADRANT
TYPICAL IMPRESSIONS PERCEIVED BY
COMBINATION OF THREE FACTORS

FIG.10 FEATURES MAP

AVERAGE FACE

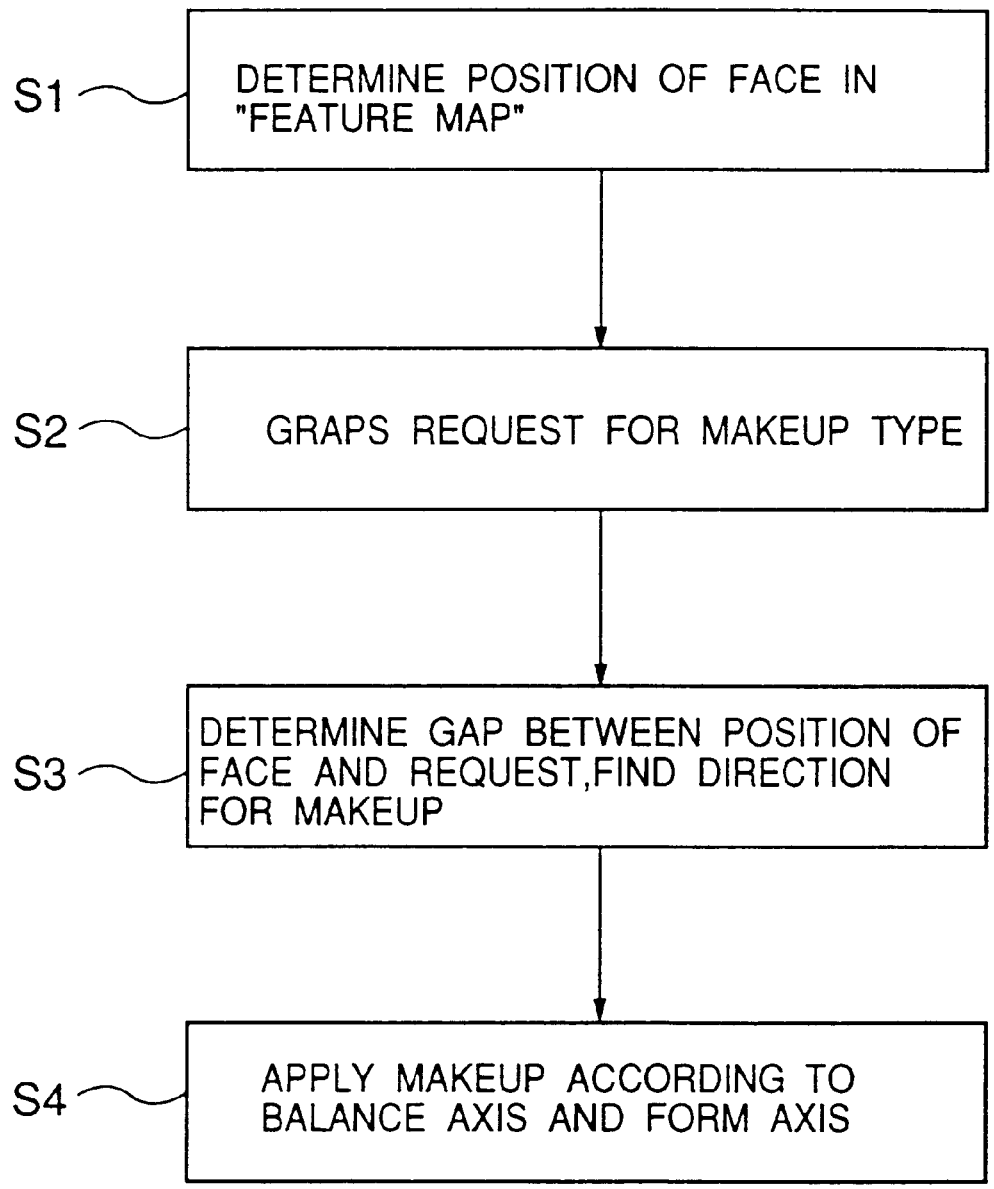

METHOD FOR CLASSIFYING FEATURES AND A MAP REPRESENTING THE FEATURES

BACKGROUND OF THE INVENTION

1. Field of the Invention

The present invention relates to a method for classifying features of a face by each character of the face, and, more particularly, to a method for extracting characters of a face from a view point of form and for classifying features in accordance with the extracted characters, and a features map produced by using coordinate axes based on the method for classifying features. The features map can be used for expressing an image produced by applying makeup, and is particularly suitable for use in esthetic counseling with a client at a cosmetic shop or a beauty salon, or to educate a cosmetic consultant or a beautician.

2. Description of the Related Art

Generally, in many cases, makeup is applied to a face in accordance with individual experience or perceptivity. When applying makeup for other persons, the unique characters of each face, which is an object for the makeup, must be considered. Additionally, it requires much experience and a special sense to apply makeup so as to respond to a request by each person. Thus, it takes a considerable number of years to reach a certain level of skill.

Attempts have been made to logically explain a method for expressing an image created by applying makeup. A conventional way of expressing an image created by applying makeup utilizes a modeling theory which recognizes characters of a form and what impression is provided by viewing the characters so as to apply it to the makeup. For example, as shown in FIG. 1, a straight line provides an impression of sharpness or a static image. A curved line provides an impression of softness or a dynamic image. Accordingly, by making an eyebrow, a contour of lips or a hair style linear or curvilinear, a sharp image or a soft image can be created, respectively. Similarly, a quiet image can be provided by using downwardly extending lines, or a vigorous image can be provided by using bold lines.

However, each face has its own characters, and the modeling theory can be applied only on a single character basis. Thus, the use of the modeling theory alone may result in an unbalanced makeup application for each face. Additionally, although a makeup technique should be different for features of each face, there is no method which systematically represents such a makeup technique. There is large needs among many women for creating an exactly desired image by a makeup. However, there is no makeup method which satisfies such a need and, thus, the development of such a makeup method is desired.

SUMMARY OF THE INVENTION

It is a general object of the present invention to provide an improved and useful method for classifying features and a features map produced based on the method for classifying features.

A more specific object of the present invention is to provide a method for classifying features in which a character of each face is analyzed so that the features is appropriately classified or recognized in order to facilitate an exact and easy creation of an image produced by applying makeup by handling a facial appearance comprehensively so as to make a cause creating an image of a face clear by a scientific manner so as to be able to modify a form of a face or an appearance of the form of the face.

Another object of the present invention is to provide a features map which is used as a guideline for creating an image produced by applying makeup based on the method for classifying.

In order to achieve the above-mentioned objects, there is provided according to one aspect of the present invention a method for classifying features of a face, comprising the steps of:

a) preparing a first index representing one of a length of the face and a configuration of formational elements of the face, the formational elements including an eye, an eyebrow, a mouth and a nose, and preparing a second index representing one of a contour of the face and a contour of each of the formational elements of the face; and b) classifying the face into one of groups of features each of which provides similar appearance by using the first index and the second index.

According to the above invention, the features can be systematically classified by using two indexes. Since the relationship between the form of the face and the impression provided therefrom is established, the features classified by the present method can be related to impressions provided by the features. This facilitates a determination as to what impression is provided by the classified features.

Additionally, there is provided according to another aspect of the present invention a method for classifying features of a face, comprising the steps of:

a) preparing two-dimensional coordinates defined by a balance axis and a form axis, the balance axis representing one of a length of the face and a configuration of formational elements of the face, the formational elements including an eye, an eyebrow, a mouth and a nose, the form axis representing one of a contour of the face and a contour of at least one of the formational elements of the face; and b) classifying the face into one of groups of features each of which provides similar appearance by locating the face on the coordinates.

According to the above invention, the face can be classified by form. Thereby, a similarity between a character of the face and the features can be easily recognized.

Additionally, there is provided according to another aspect of the present invention, a features map used for classifying features of a face, the features map comprising two-dimensional coordinates defined by a first axis and a second axis, the first axis representing one of a length of the face and an arrangement of formational elements of the face, the formational elements including an eye, an eyebrow, a mouth and a nose, the second axis representing one of a contour of the face and a contour of at least one of the formational elements of the face.

According to the above invention, the relationship between the form of the face and the impression provided therefrom can be easily recognized by locating the face on the features map. Thus, the features map facilitates a determination as to what impression and character are provided by the classified features. Additionally, it can be easily known from the form of the face as to how to apply makeup so as to create a desired image.

In one embodiment of the present invention, the first axis may represent a length of the face so that the length of the face increases toward one side of the first axis and the length of the face decreases toward the other side of the first axis, and wherein the second axis may represent a degree of curvilinearity or linearity of contours of the face and the formational elements of the face so that the curvilinearity increases toward one side of the second axis and the linearity increases toward the other side of the second axis.

Additionally, the first axis may further represent a degree of separation of the formational elements of the face so that a first distance between each of the formational elements and a longitudinal center of the face is increased toward the one side of the first axis and the first distance is decreased toward the other side of the first axis.

Further, the first axis may further represent a degree of separation of the formational elements of the face so that a second distance between each of the formational elements and a transverse center of the face is decreased toward the one side of the first axis and the second distance is increased toward the other side of the first axis.

Additionally, in the features map according to the present invention, a face image may be presented in each of quadrants of the two-dimensional coordinates, the face image providing an impression of the face corresponding to the respective quadrants.

Additionally, in the features map according to the present invention, a typical impression of a face may be presented in each of quadrants of the two-dimensional coordinates, the typical impression being provided by the face corresponding to the respective quadrants.

Other objects, features and advantages of the present invention will become more apparent from the following detailed description when read in conjunction with the accompanying drawings.

BRIEF DESCRIPTION OF THE DRAWINGS

FIG. 5A is an illustration of items to be measured with respect to shapes of an eye and an eyebrow;

FIG. 5B is an illustration of items to be measured with respect to an eyebrow; FIG. 5C is an illustration of items to be measured with respect to a mouth;

FIG. 6 is an illustration for explaining a degree of formational deviation of similar faces;

FIGS. 7A, 7B and 7C are illustrations of coordinates used in a multidimensional scaling;

FIG. 12 is a flowchart of a makeup operation by using the features map;

BRIEF DESCRIPTION OF THE PREFERRED EMBODIMENTS (Method for Classifying Features)

The following experiments were performed by using determination of similarity of a face so as to clarify a mechanism for discriminating a face as to how a person discriminates a face in order to obtain an index for classifying features for each character.

Twelve female participate in the experiments, and forty photographs of faces of women in their 20s, 30s and 40s were used as samples.

Figure 1:
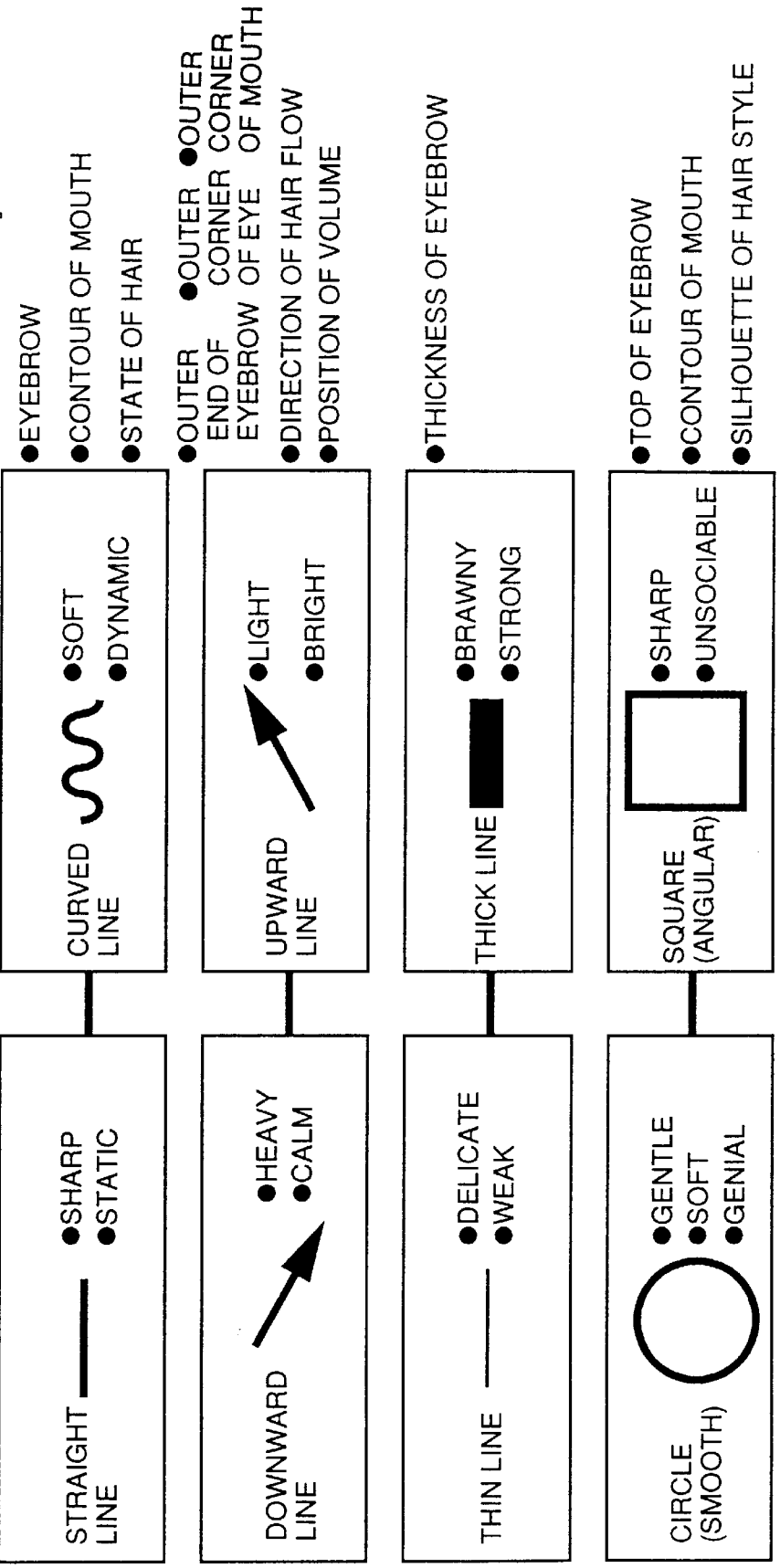
FIG. 1 is an illustration for applying makeup according to a conventional modeling theory.
Figure 2:
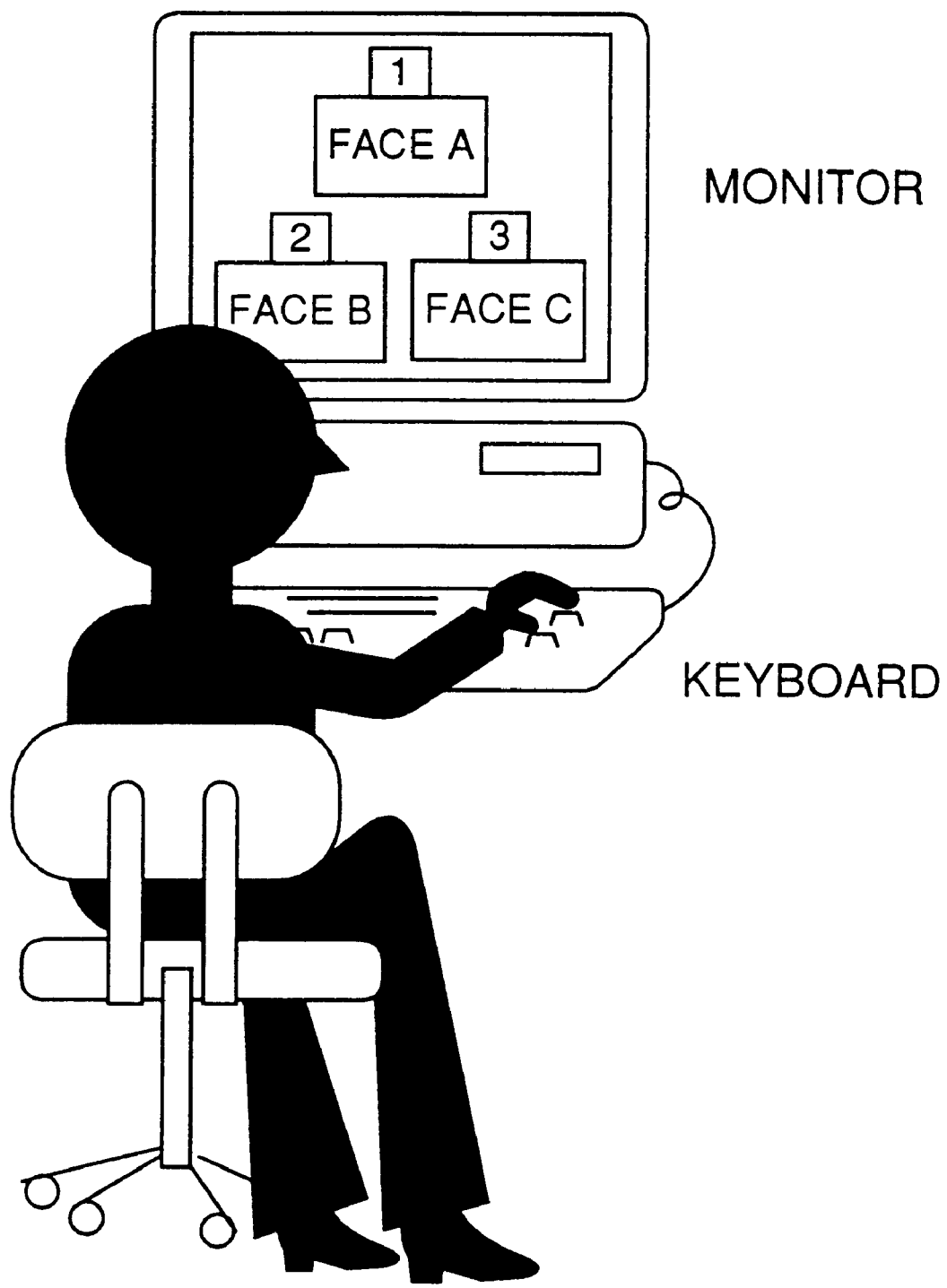
FIG. 2 is an illustration of a screen displayed in experiments performed in order to examine the clues used for facial discrimination for discrimination of faces.

In the experiments, three faces A, B and C were simultaneously displayed on a monitor screen as shown in FIG. 2. The participants selected two faces which were thought to be similar to each other, and input the numbers of the selected photographs through a keyboard.

Figure 3:
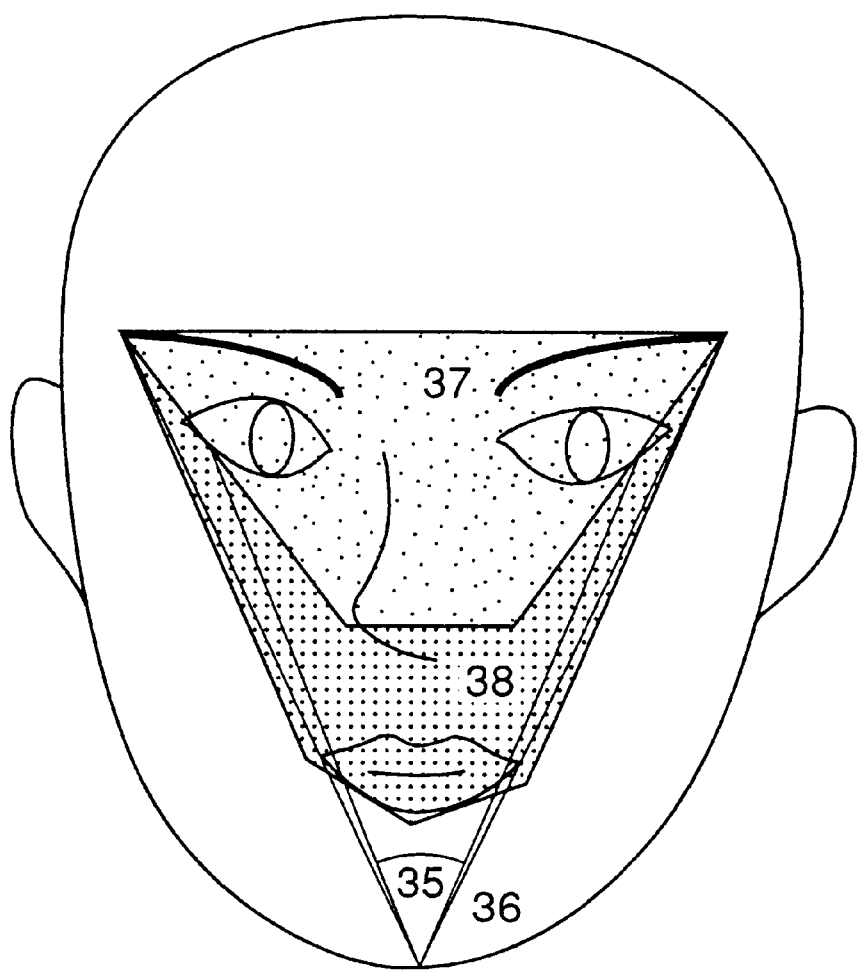
FIG. 3 is an illustration of items to be measured with respect to areas of parts of a face.
Figure 4:
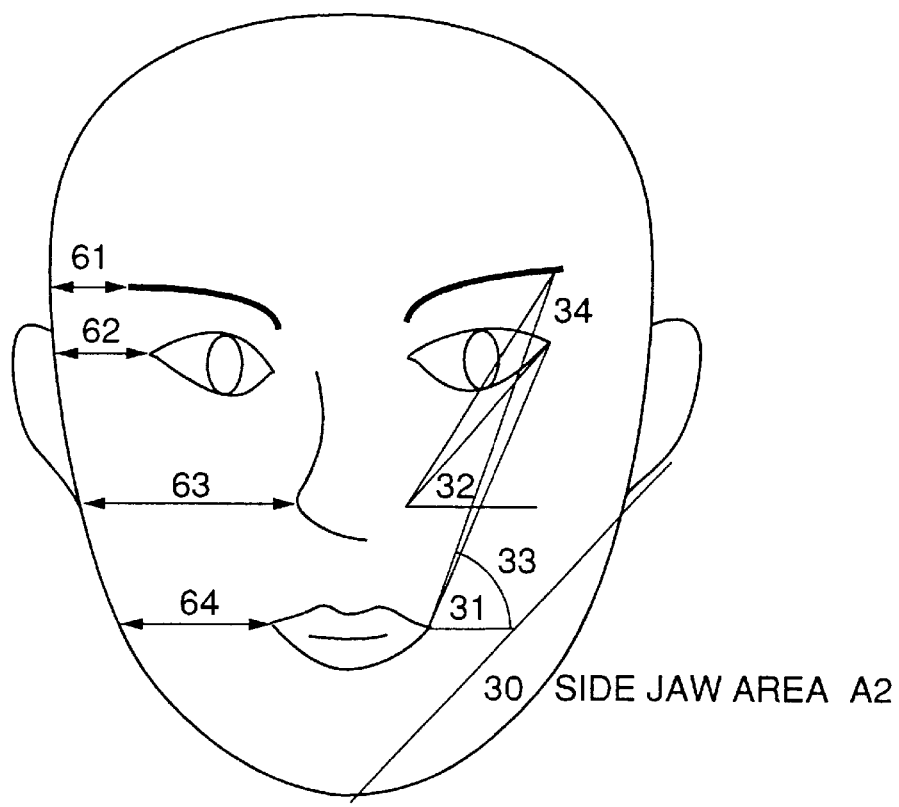
FIG. 4 is an illustration of items to be measured with respect to a configuration of formational elements.

The forty photographs were divided into two groups, and all participants evaluated both of the two groups. Evaluations of all combinations $_{20}C_3=1,140$ were performed for each group, and frequencies of the same selection, that is, the number of accumulation of the same selection was recorded. For an analysis performed later, forty-seven lengths, the size of ten characters and nine angles such as a length of the face, a size of the face, a degree of eye slant were measured in each photograph. FIGS. 3 to 5 show items that were measured. FIG. 3 shows measured items related to areas of parts of the face. FIG. 4 shows measured items related to positional relationships between formational elements of the face such as eyes, eyebrows, a mouth and a nose. FIG. 5 shows measured items related to a shape of formational elements of the face such as eyes, eyebrows and a mouth.

A Z score was calculated for the items shown in FIGS. 3 to 5 for each face. The Z score was obtained by normalizing the value of measurement with zero mean and variance one. This is referred to as a degree of deviation from the mean. FIG. 6 shows degrees of deviation for typical items with respect to samples S1 and S2 which particularly show a high similarity to each other. It should be noted that the maximum value (MAX) and the minimum value (MIN) among values for the 40 samples are indicated as a reference in addition to the values for the samples S1 and S2.

As shown in FIG. 6, faces having high similarity with respect to their form. Particularly, it can be appreciated that the values of eyes and contour of face are similar. Additionally, it can be appreciated that values of facial parts having high deviation are similar.

According to the above-mentioned analysis, it is understood that common deviation from the mean of the form of the face and the similar values of the contour and the eyes are important clues for discrimination of similarity of faces.

Thereafter, the frequency of selection was analyzed by a multidimensional scaling. The multidimensional scaling is a method for scaling sampling units by approximating their distances by distances in a lower dimensional space. According to this analysis, it was clarified as to which index was used by participants to determine the similarity, that is, an index used for discriminating a face of a person become known.

A three-dimensional solution was obtained in the analysis by the multidimensional scaling. That is, it became clear that mainly three indexes were used to determine the similarity.

The three indexes of each of the three dimensions were assumed by a multiple regression analysis using coordinate values of configuration of each face obtained from the multidimension scaling as criterion variables and measured values of each face as explanatory variables. As a result, the first dimension was assumed to be a "length of the face and arrangement of parts or configuration of facial features of the face", that is, whether the length of the face is short or long and whether the positions of eyebrows, a nose and a mouth are close to the center between the right and left. The second dimension was assumed to be "shape of eyes", that is, whether it is round and curvilinear or elongated and linear. The third dimension was assumed to be "shapes of eyebrow and mouth", that is, whether they are round and curvilinear or elongated and linear.

FIGS. 7A, 7B and 7C show examples in which samples of faces having high similarity are scaled in different dimensional space; FIG. 7A shows an example in which values are scaled in the coordinate space defined by the "length of a face and an arrangement of parts or configuration of facial features of the face" and the "shape of eyes"; FIG. 7B shows an example in which the values are scaled in the coordinate space defined by the "length of a face and an arrangement of parts or configuration of facial features of the face" and "shapes of eyebrow and mouth"; FIG. 7C shows an example in which the values are scaled in the coordinate space defined by the "shape of eyes" and the "shapes of eyebrows and mouth".

As shown in these examples, the faces having high similarity are scaled by forming a cluster in each coordinate space. That is, the samples S873, S882 and S777 always form the same cluster, and the samples S755, S766, S770 and S773 always form the same cluster in each coordinate space. As a result, it is appreciated that the "length of a face and arrangement of parts or configuration of facial features", the "shape of eyes" and the "shapes of eyebrow and mouth" are indexes for determining similarity. This backs up the results of the above-mentioned experiments.

When a determination is made for similarity of faces based on the above-mentioned experiments and analysis, "a length of the face or whether parts are close to or apart from the center between the upper end and the lower end of the face, or whether the parts are close to or apart from the center between the right and left of the face" and "shapes of the parts" play important roles. Accordingly, it was found that faces can be systematically classified by characters of forms of faces.

Figure 8:
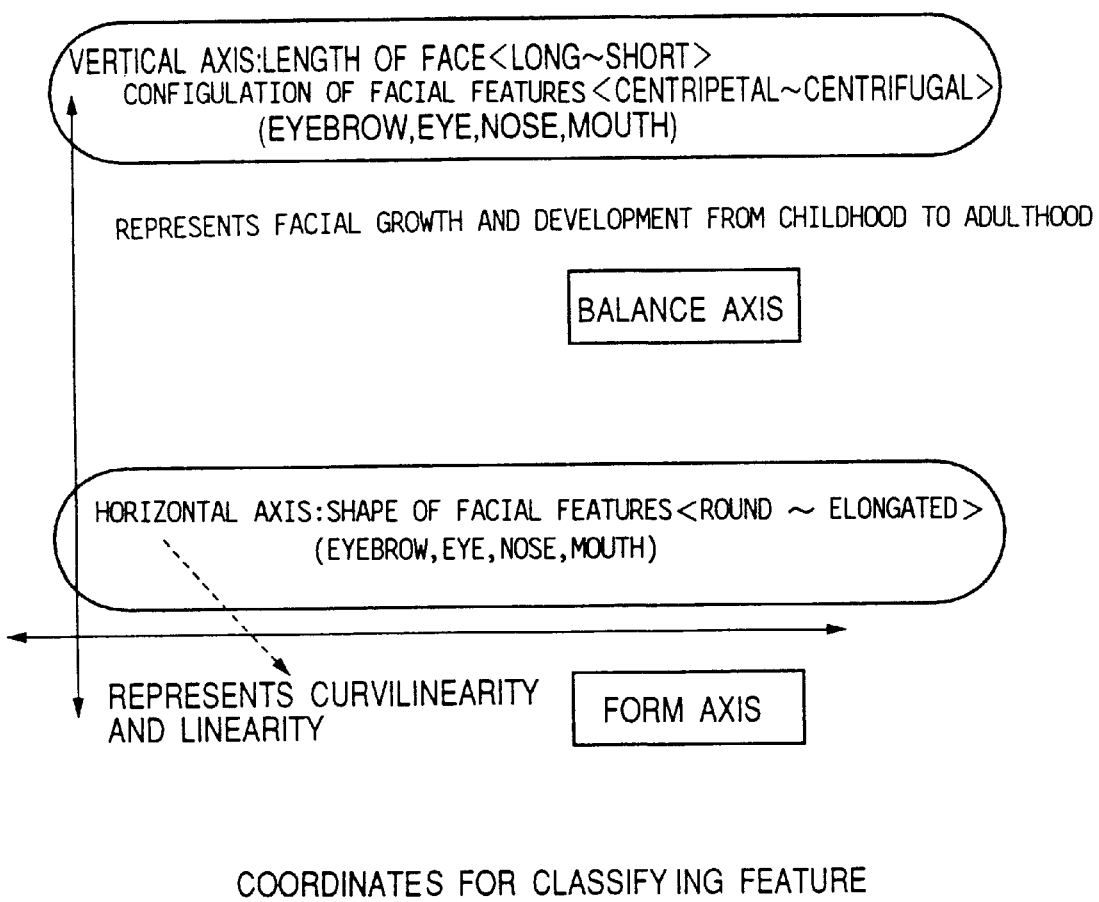
FIG. 8 is an illustration of two-axis coordinates defined by a balance axis and a form axis.

FIG. 8 shows a coordinate space defined by coordinate axes corresponding to the above-mentioned indexes. The vertical axis corresponds to the "length of a face and arrangement of parts of configuration of facial features (eyebrows, eyes, nose and mouth) of the face", and the horizontal axis corresponds to "shape of facial parts (eyebrows, eyes, nose and mouth)".

The vertical axis represents changes in the length of the face from "short" to "long", or changes in the position of the parts with respect to the longitudinal center between the left and right from positions apart from the center to positions close to the center, or changes in the position of the parts with respect to the transverse center between the upper end and the lower end from positions apart from the center to positions close to the center. These changes correspond to the changes relating to growth from childhood to adulthood. A degree of childlikeness increases downwardly, and a degree of adultlikeness increases upwardly. In other words, the vertical axis represents changes in a balance corresponding to growth from childhood to adulthood. In this specification, the vertical axis is referred to as a balance axis.

Additionally, the horizontal axis represents a characteristic of a shape as to whether the shape of the facial part is curvilinear or linear, and the horizontal axis is referred to as a form axis.

Figure 9:
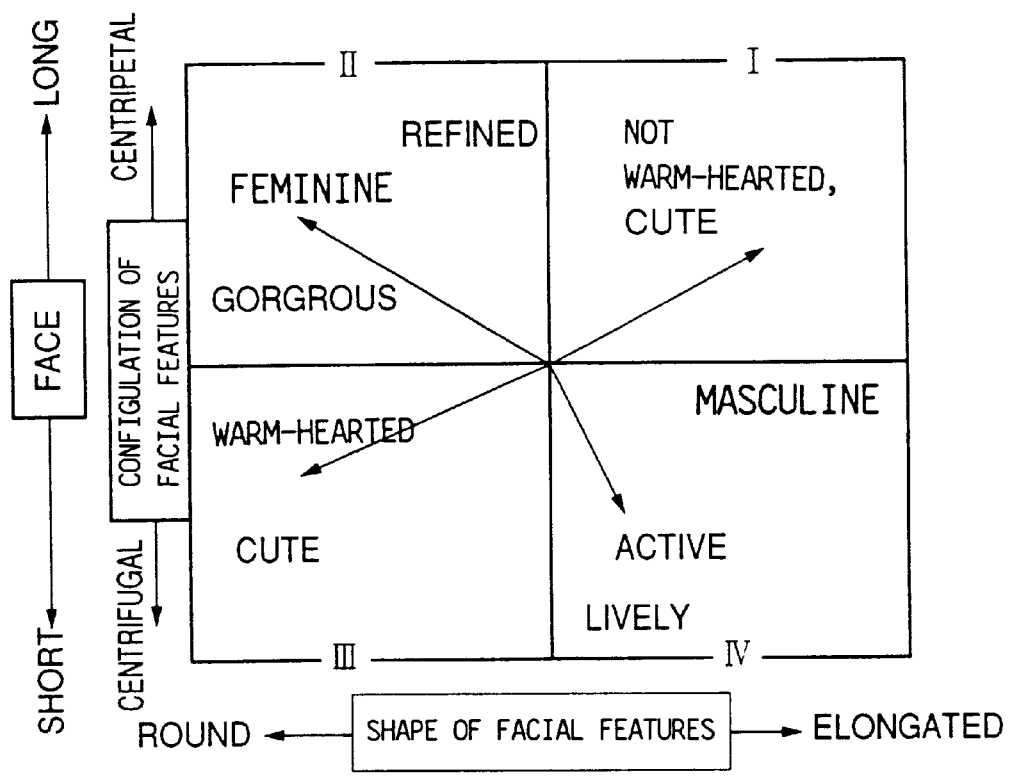
FIG. 9 is an illustration for explaining facial impressions perceived by combination of the coordinates.

By investigating a relationship between a form of a face and impressions received by the form, impressions were placed in each quadrant of the coordinates in FIG. 8. FIG. 9 shows perceived impressions positioned in each quadrant of the coordinate space of FIG. 8. For example, if the face is long and the parts are curvilinear (the second quadrant), an elegant, feminine impression is strong. On the other hand, if the face is short and the form is linear, a fresh, active impression is perceived. Accordingly, the relationship between the facial form and facial impression was clarified.

As mentioned above, faces can be classified by each character by classifying the face by using, as indexes, a length of the face and an arrangement of formational elements of the face such as eyes, eyebrows, mouth and nose, and the shape of the formational elements. Additionally, faces can be classified by each impression received from the forms of the faces. By doing this, an exact creation of a desired image can be performed when applying makeup. Additionally, by providing a classification produced by the method for classifying features according to the present invention to a client list of a beauty salon, a guideline can be presented when creating an image matching the client.

(Features Map)

Figure 10:
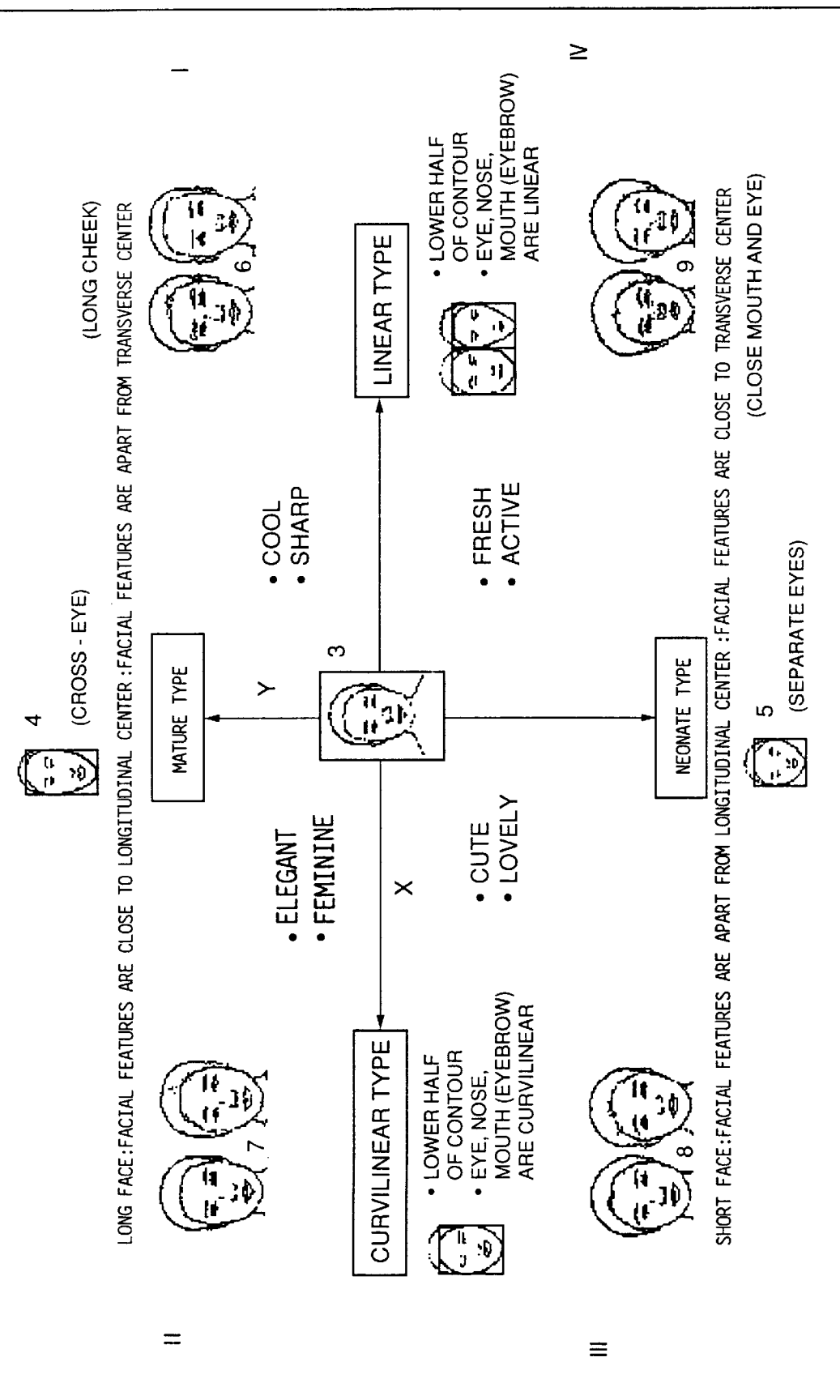
FIG. 10 is an illustration of a features map according to an embodiment of the present invention.

According to the above-mentioned experiments and analysis, the relationship between the form of a face and an impression was clarified. FIG. 10 shows an embodiment of a features map 1 which was produced based on knowledge obtained in the process of obtaining the method for classifying features.

Similar to that shown in FIGS. 8 and 9, the features map 1 is produced by a two-axis coordinate space 2 defined by the balance axis Y, as the vertical axis, which represents the "length of a face and an arrangement of eyes, eyebrows, mouth and nose" and the form axis X, as the horizontal axis, which represents formational elements of the face. A woman's average face 3 is located in the center (origin) of the coordinate space 2. Additionally, a long face 4 and a short face 5 are located at the upper and lower ends of the balance axis Y as the vertical axis, respectively. The upper and lower ends of the balance axis Y are provided with descriptions such as long face, short face, parts are close to the center, or the facial parts are apart from the center.

Additionally, the left and right ends of the form axis X as the horizontal axis are provided with descriptions indicating that a shape of the lower half of the face and shapes of eyes, nose, mouth and eyebrows are curvilinear or linear.

Each of the first to fourth quadrants of coordinate space 2 defined by the balance axis Y and the form axis X are provided with descriptions of typical images or impressions possessed by the facial form corresponding to each quadrant. For example, impressions of coolness, sharpness and dynamics are written in the first quadrant; impressions of gentleness and womanlikeness are written in the second quadrant; impressions of cuteness and loveliness are written in the third quadrant; and impressions of freshness and activeness are written in the fourth quadrant.

Figure 11:
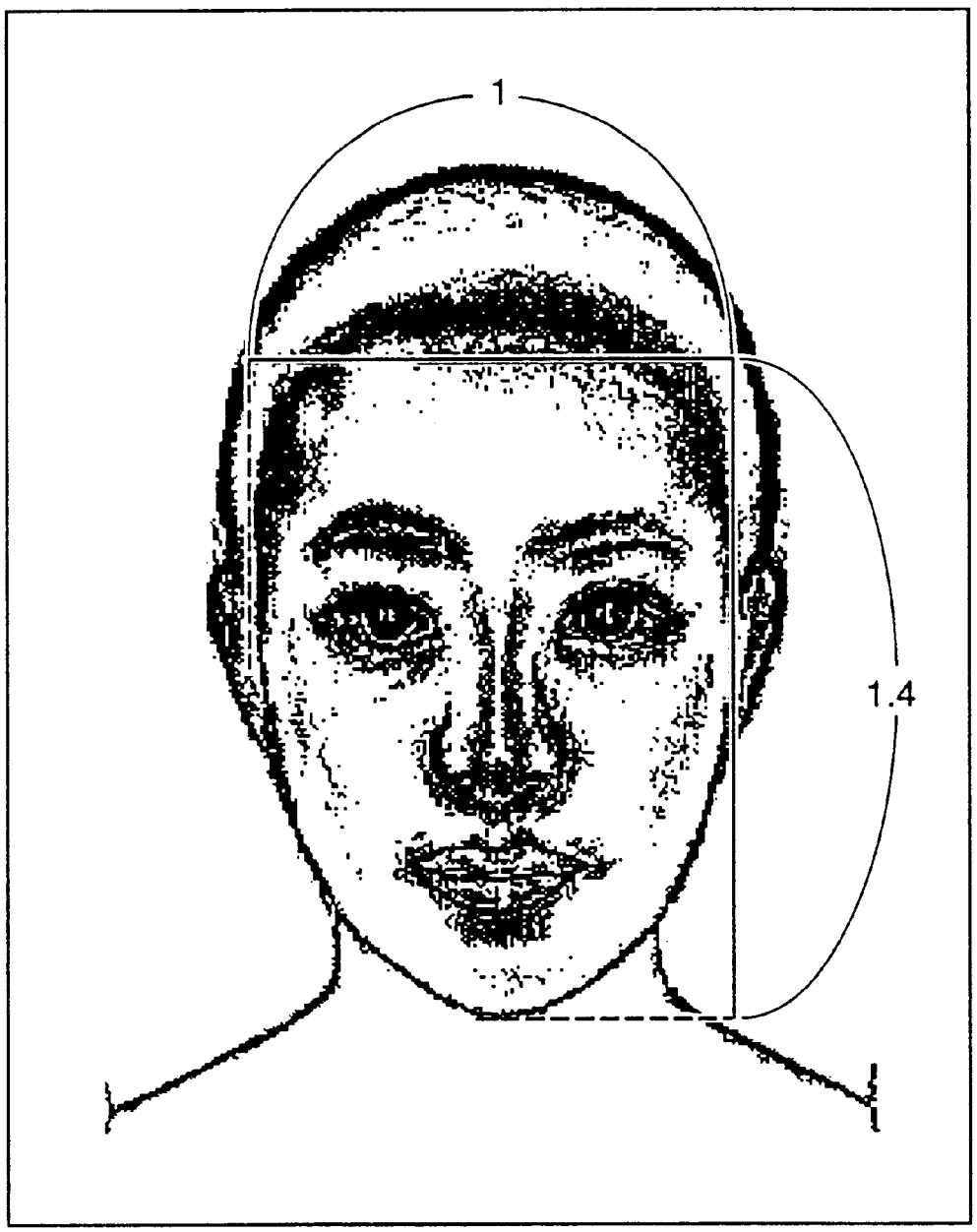
FIG. 11 is an illustration of a shape of an average face.

Additionally, typical face images 7 to 10 of which characteristics are emphasized are provided in the respective quadrant so as to facilitate a discrimination of the faces. It should be noted that the average face 3 in the center and the typical face images 7 to 10 in the quadrants are produced by morphing which is a technique of computer graphics. For example, the average face 3 in the center is produced by mixing forty women's face photographs, and has values shown in FIG. 11. Each of the typical face images can be produced by deforming the average face so as to emphasize each characteristic.

A description will now be given, with reference to a flowchart of FIG. 12 and FIGS. 13A to 13C, of an example in which the features map 1 shown in FIG. 10 is used as a guideline to apply makeup.

First, a position of the face to have makeup applied is determined along the balance axis Y of the features map 1 with respect to the length of face and the fact whether the parts are close to or apart from the transverse center between the upper end and the lower end, or whether the parts are close to or apart from the center between the left and right (step S1).

In this case, it is checked whether the length of the face is long or short along the balance axis Y. The length of the face is determined by a ratio of a width of the face and a length from a hairline to base of chin. It should be noted that the average face has the ratio of 1:1.4.

If it is difficult to determine by the length of the face, it is checked whether the formational elements (parts) of the face such as eyes, a nose and a mouth are close to or distant from the longitudinal center between the left and right, or whether they are close to or distant from the transverse center between the upper end and the lower end. For example, if the distance between the eyes is short, or if the cheek under the eyes is long, it is determined that the balance is mature. Contrary, if the distance between the eyes is long, or if the eyes and the mouth are relatively close to each other, it is determined that the balance is neonate.

Thereafter, the position of the shapes of the parts are determined along the form axis X. In this case, if the lower half of the contour of the face is plump, or if the shapes of eyes, the nose, the mouth and the eyebrows have a feel of roundness, it is determined that the form is curvilinear. On the contrary, if the lower half of the contour of the face is angular or sharp, or if the shapes of the eyes, the nose, the mouth and the eyebrows are linear (sharp), it is determined that the form is linear.

Figure 13A:
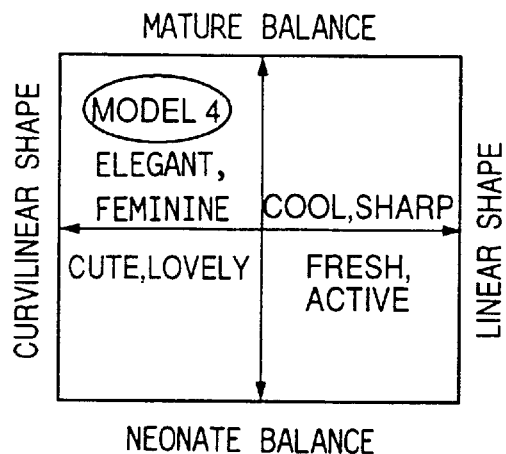
FIGS. 13A, 13B and 13C are illustrations for explaining creation of a facial image using cosmetics based on the features map.

It is now assumed, as the result of an analysis on a natural face, that a determination is made that the balance is mature and the form provides an impression of curvilinear. The face is located in the position indicated in the second quadrant on the features map 1 as shown in FIG. 13A.

Then, a beautician asks for a request for a makeup type and grasps the customer's request (step S2). It is assumed that the request of the makeup type is an image providing a cool and sharp impression.

Figure 13B:
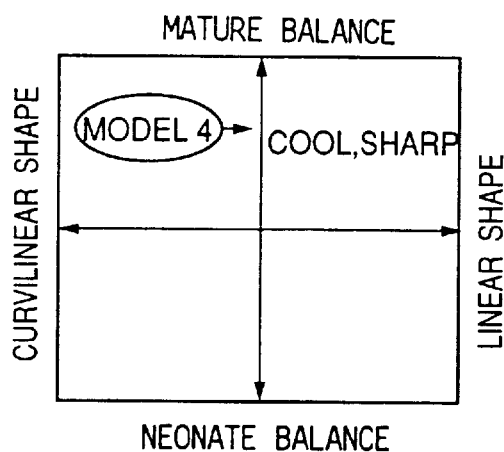

A face having the cool and sharp image is located in the first quadrant of the features map. Thus, a direction from the position of the present natural face in the second quadrant is recognized on the features map 1, and a way of creating the image is found by referring to the indications in the features map (step S3). In this case, it is found that the position along the balance axis should be maintained and the position along the form axis should be moved toward the linear shape as shown in FIG. 13B.

Then, makeup is applied in accordance with the way of creating the image which was found in step S3 (step S4). In this case, the mature balance is presented without change, and the makeup is applied so that the arrangement of the facial parts are changed toward the linear shape along the form axis. Specifically, the shape of the eyebrows and the contour of the lips are represented by a linear image. Thereby, a makeup procedure satisfying the requested cool and sharp image can be created.

Figure 13C:
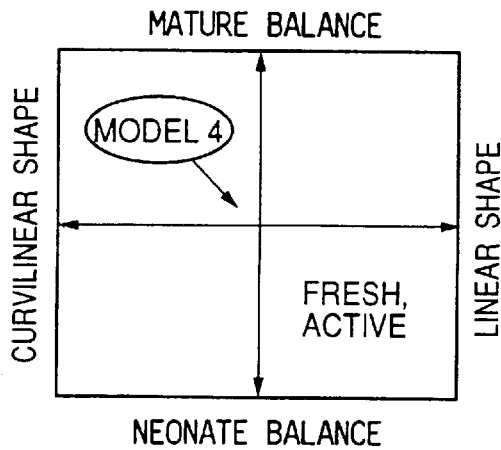

FIG. 13C shows an example in which the request for the makeup type is to create an impression of freshness and activeness. In this example, the form corresponding to the impression of freshness and activeness is located in the fourth quadrant on the features map. This position is opposite to the position of the natural face located in the second quadrant. Thus, a considerable technique is required to change the image.

With respect to the balance axis, the position is shifted toward the neonate impression. The position of a top of the eyebrow is slightly lowered, and rouge is put in the center of the face in a round shape so as to provide an impression of a reduced length of the face. Additionally, since the position is shifted toward the linear shape with respect to the form axis, the contour of the eyebrows and the lips is drawn linearly. Thereby, a slightly fresh and active image can be created from the mature and elegant image.

As mentioned above, by using the features map defined by the balance axis and the form axis according to the present embodiment, if can be easily grasped as to which position the objective face is located in with respect to form and what impression is provided by the face. Additionally, the position of the objective face on the features map can be easily recognized by determining similarity with typical face images. Thus, a short cut method for applying makeup to create a desired image can be obtained.

Figure 14:
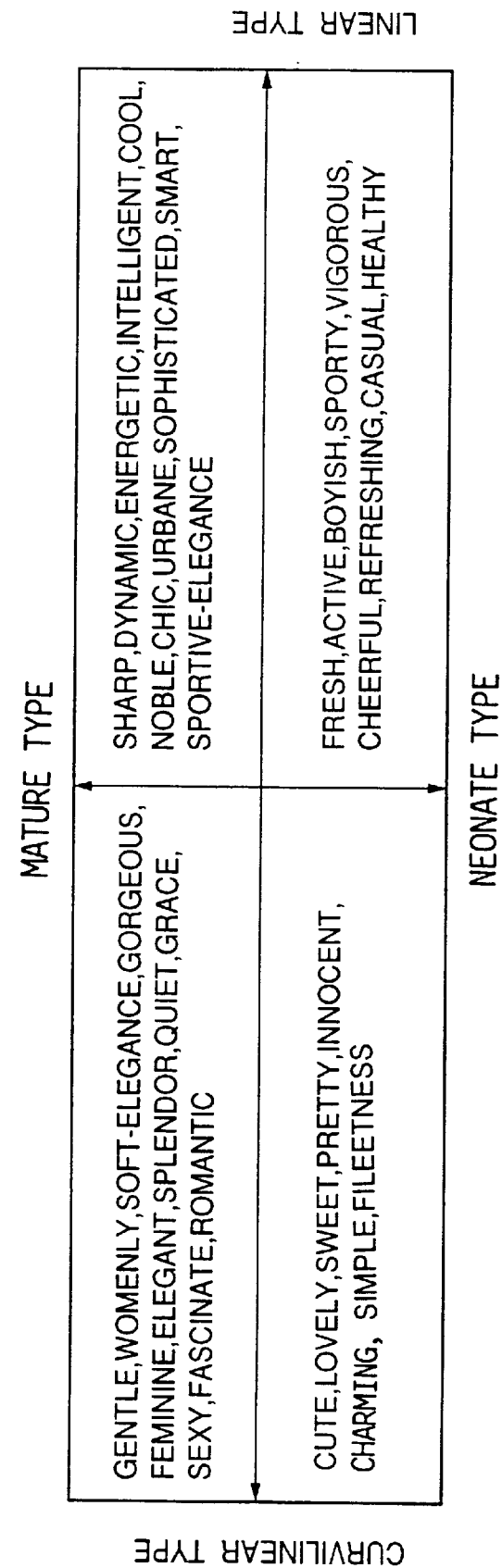
FIG. 14 is an illustration of a features map according to another embodiment of the present invention.

FIG. 14 shows a features map 10 according to another embodiment of the present invention. The features map 10 indicates a number of types of images provided by features located in each quadrant of a coordinate defined by the balance axis, as the vertical axis, which represents mature or neonate and the form axis, as the horizontal axis, which represents the shapes of the parts of a face. Since a number of relationships between features and an impression on the two-axis coordinates are indicated, the features map 10 is useful for creating an image in detail.

It should be noted that although the balance axis is set as the vertical axis and the form axis is used as the horizontal axis in the above-mentioned embodiments, the vertical axis and the horizontal axis may be switched. Additionally, the contents of indication and the face images may be located in appropriate positions, if necessary.

By using the features map according to the present invention, characters of a face can be easily recognized. The features map can be used as a guide line when applying makeup. For example, the features map can be used as a useful assisting tool in cosmetic counseling with a client at a cosmetic shop or a beauty salon or as an educational tool or a practical work of a cosmetic consultant or a beautician.

The present invention is not limited to the specifically disclosed embodiments, and variations and modifications may be made without departing from the present invention.

What is claimed is:

1. A method for classifying features of a face so as to provide a guideline for applying desired makeup to the face, comprising the steps of:

a) preparing a first index representing one of a length of the face and a configuration of formational elements of the face, said formational elements including an eye, an eyebrow, a mouth and a nose, and preparing a second index representing one of a contour of the face and a contour of each of the formational elements of the face;

b) classifying the face into one of groups of features each of which provides similar appearance by using said first index and said second index; and c) obtaining the guideline for the desired makeup in accordance with the one of the groups of features.

2. A method of classifying features of a face so as to provide a guideline for applying desired makeup to the face, comprising the steps of:

a) preparing two-dimensional coordinates defined by a balance axis and a form axis, said balance axis representing one of a length of the face and a configuration of formation elements of the face, said formational elements including an eye, an eyebrow, a mouth and a nose, said form axis representing one of a contour of the face and a contour of at least one of the formational elements of the face;

b) classifying the face into one of groups of features each of which provides similar appearance by locating the face on the coordinates; and c) obtaining the guideline for the desired makeup in accordance with the one of the groups of features.

3. A features map used for classifying features of a face, said features map comprising two-dimensional coordinates defined by a first axis and a second axis, said first axis representing one of a length of the face and an arrangement of formational elements of the face, said formational elements including an eye, an eyebrow, a mouth and a nose, said second axis representing one of a contour of the face and a contour of at least one of the formational elements of the face, the features map classifying the features of the face into one of groups of features each of which provides similar appearance by locating the face on the coordinates so as to provide a guideline for applying desired makeup to the face in accordance with the one of the groups of the features.

4. The features map as claimed in claim 3, wherein said first axis represents a length of the face so that the length of the face increases toward one side of said first axis and the length of the face decreases toward the other side of the first axis, and wherein said second axis represents a degree of curvilinearity or linearity of contours of the face and the formational elements of the face so that the curvilinearity increases toward one side of the second axis and the linearity increases toward the other side of the second axis.

5. The features map as claimed in claim 4, wherein said first axis further represents a degree of separation of the formational elements of the face so that a first distance between each of the formational elements and a longitudinal center of the face is increased toward said one side of said first axis and the first distance is decreased toward said other side of said first axis.

6. The features map as claimed in claim 5, wherein said first axis further represents a degree of separation of the formational elements of the face so that a second distance between each of the formational elements and a transverse center of the face is decreased toward said one side of said first axis and the second distance is increased toward said other side of said first axis.

7. The features map as claimed in claim 3, wherein a face image is presented in each of quadrants of said two-dimensional coordinates, said face image providing an impression of the face corresponding to the respective quadrants.

8. The features map as claimed in claim 3, wherein a typical impression of a face is presented in each of quadrants of said two-dimensional coordinates, said typical impression being provided by the face corresponding to the respective quadrants.

* * * * *